United States Patent Office 3,444,973
Patented May 20, 1969

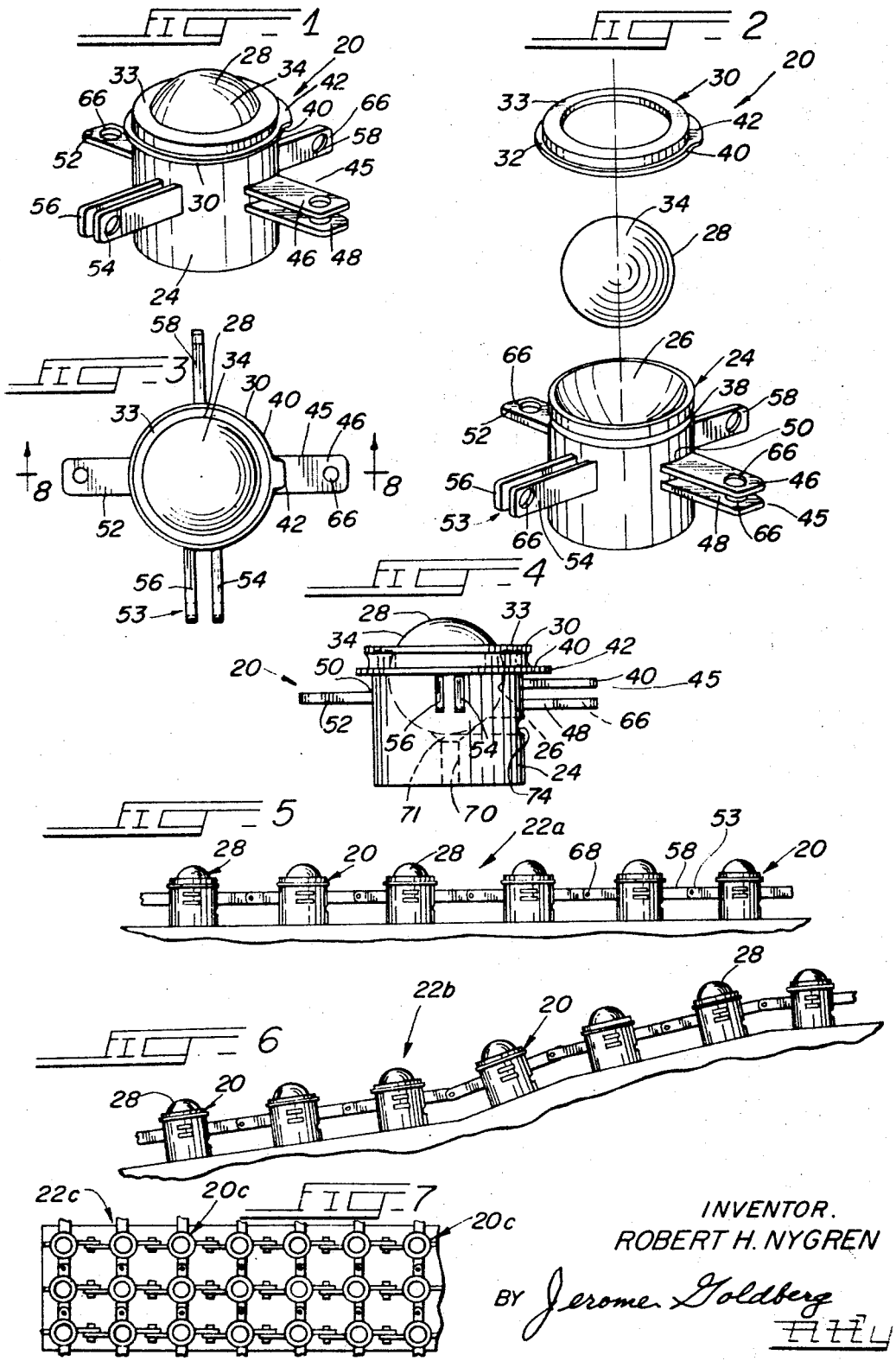

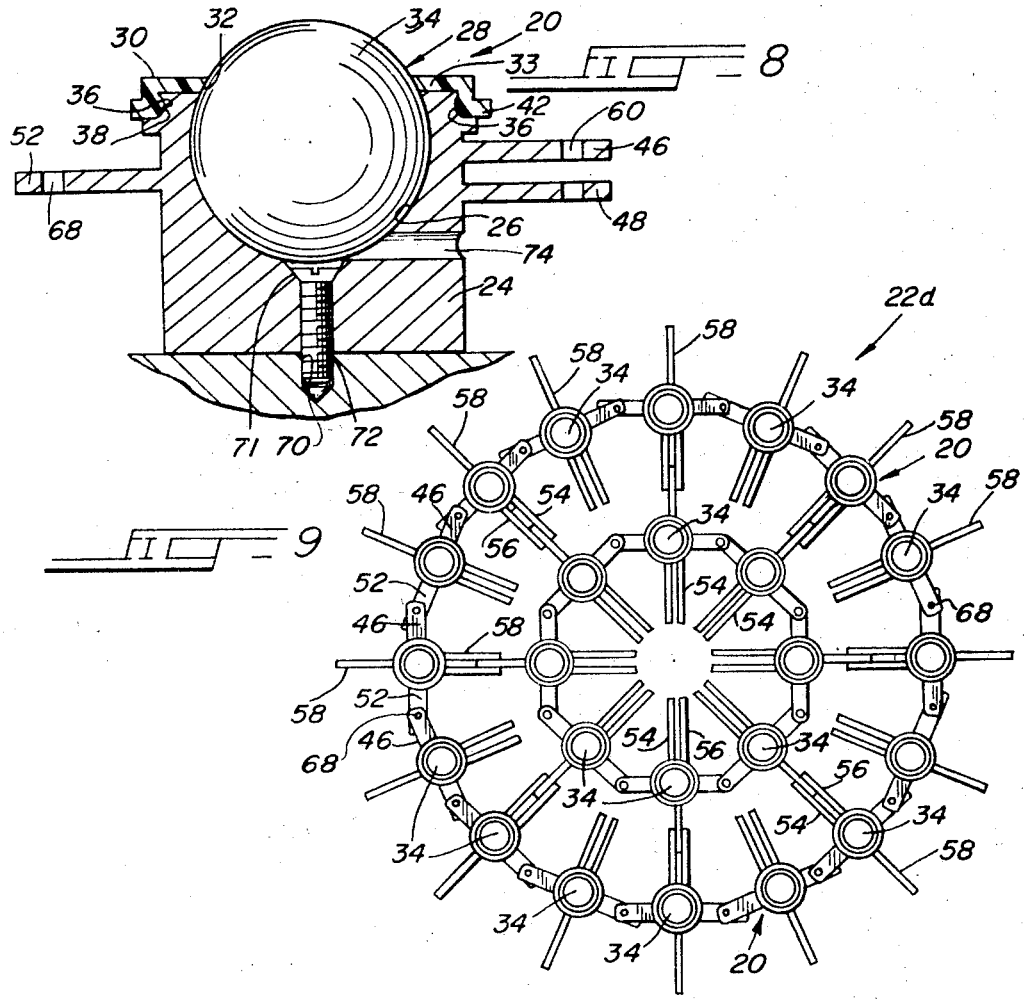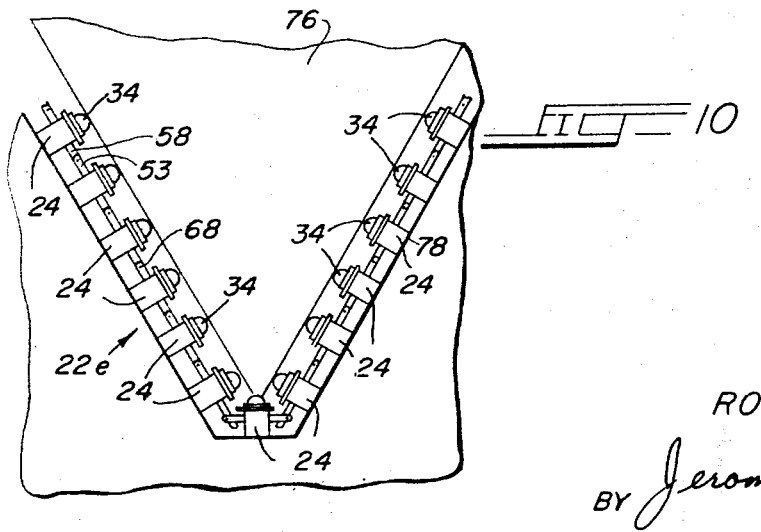

3,444,973
LINK FOR A PORTABLE CONVEYOR
Robert H. Nygren, 2310 W. Arthur, Chicago, Ill. 60645
Filed Mar. 9, 1967, Ser. No. 621,840
Int. Cl. B65g *13/11, 39/02*
U.S. Cl. 193—35                            4 Claims

ABSTRACT OF THE DISCLOSURE

A link for a conveyor having a housing with a ball rotatably positioned therein and including attachment means for connecting a plurality of said links together to form a conveyor for sliding articles thereover in any direction. Said attachment means further enables the link to be operatively connected over curved and inclined surfaces.

Background of the invention

This invention relates generally to a link member for a portable conveyor and more particularly relates to a link member comprising universal attachment means to connect a plurality of said link members together and form a conveyor having substantially any predetermined shape and/or a conveyor for use over curved and inclined surfaces.

Prior to the invention herein, conveyors have been assembled from a plurality of identical links. Generally, the movement of articles over these conveyors were limited to movement in either of two directions. However, when it was desirable or necessary to convey articles in more than the two directions, a transfer table in some instances was specifically constructed having a plurality of connecting points for securing the link and thus affording means for constructing multidirectional conveyors. Although the use of the transfer table provided more than two directions for conveying articles, these prior conveyors had several limitations which precluded their widespread acceptance. For example, the length or configuration of the assembled conveyor was limited to the dimensions of the transfer table. Moreover, the conveyors were unsuitable for use over curved and irregular surfaces.

Summary of the invention

The link of this invention provides an attachment means for assembling a plurality of said links to form a conveyor for transporting articles in any desired direction. Moreover, the attachment means enables a conveyor to be assembled for use over curved or irregularly contoured surfaces.

Another feature is to provide a removable retaining means to maintain a ball rotatably locked within the housing of the link of this invention. The ball may be easily and conveniently removed from the housing by disassociating the retaining means from the link.

It is therefore a primary object of this invention to provide a link having universal attachment means to enable a plurality of the links to be assembled into a conveyor for transporting articles in any desired direction.

It is another object to provide a link having universal attachment means to enable a plurality of the links to be assembled into a conveyor for transporting articles over flat, inclined or irregularly contoured surfaces.

Another object is to provide a link enabling a plurality of the same to be assembled into a conveyor having substantially any predetermined configuration.

Another object is to provide a removable retaining means for rotatably locking a ball within a housing which may be easily disassociated from the housing; thereby permitting easy and convenient removal of the ball.

Still another object is to assemble a plurality of the links of this invention into a conveyor for pulling up or launching a boat from an inclined boat landing.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

Brief description of the drawings

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings;

FIG. 1 is a perspective side elevational view of a link for a portable conveyor embodying the principles of the invention;

FIG. 2 is an exploded perspective view of the component parts of the link in FIG. 1;

FIG. 3 is a top view;

FIG. 4 is a front elevational view;

FIG. 5 is a side view illustrating a plurality of the links attached together to form a convyeor for transporting articles over a flat surface;

FIG. 6 is a side view illustrating a plurality of the links connected together to form a conveyor for transporting articles along an inclined and irregularly shaped surface;

FIG. 7 is a top view illustrating a plurality of the links connected together into a rectangular configuration;

FIG. 8 is a cross sectional enlarged side view taken on the plane of the line 8—8 in FIG. 3 and viewed in the direction indicated;

FIG. 9 is a top view illustrating the links connected together to form a circular conveyor; and FIG. 10 is a front view of a conveyor for transporting a boat up and down an inclined surface.

Description of the preferred embodiment

Referring now to the several figures of the drawings, the reference numeral 20 indicates generally a component part or link of a portable conveyor. Examples of the various conveyors that may be formed from a plurality of links 20 are illustrated in FIGS. 5 to 7 and 9 and 10 and indicated by the reference numeral 22 with the different suffixes, *a* to *e*. These conveyors will be referred to again later in the description.

The link 20 comprises a hollow housing 24 (see FIG. 2) open at the upper end thereof. The inside surface of the housing 24 defines a concave socket or bed 26. The housing may be constructed from plastic, wood or any other suitable material.

A spherical ball 28 seats within the socket 26. The ball 28 has a convex surface complementary with the concave surface of the socket 26 to afford free and smooth rotation of the ball within the socket. The ball is preferably formed from a magnetic sensitive steel to permit the same to be lifted from the socket with a magnet.

A cap member 30 is positioned over the top end of the housing 24. An opening 32 is formed in the upper end 33 of the cap member 30 to accommodate a protruding portion 34 of the ball 28. The radius of the opening is less than the radius of the ball but of sufficient dimension to afford free and unobstructed movement of the protruding portion 34.

A circular collar 36 is formed to the inside surface of the cap member 30 adjacent the lower edge thereof (FIG. 8) and extends inward therefrom. The collar 36 pressfits into a circular recess 38 formed inwardly from the outer surface of the housing 24.

A circular outer rim 40 is formed around the lower end of the cap member 28. A tab 42 extends outwardly from the rim 40 to afford a convenient gripping area when lifting the cap off the housing 24. Thus, the cap member 30 when positioned on the housing, locks the ball 28 inside the socket 26 without restricting the rotational movement of the same.

Each link 20 includes a universal attachment means comprising a first and second pair of complementary male and female connecting members, spaced around and protruding outward from the outside surface of the cylindrical side wall of the housing 24.

Turning now to FIGS. 1 to 4 and 8, it will be seen that one of the female connecting members indicated generally by the reference numeral 45 comprises an upper finger 46 spaced above a lower finger 48 in an opposed relationship. The inner ends 50 of the fingers 46, 48 are secured on the housing 24 and may be concavely curved to afford maximum contact with the convex outer surface of the housing 24.

A male connecting member comprises a finger 52 positioned on the opposite side of the housing with respect to fingers 46, 48 at a level to telescope within the spacing separating the upper and lower fingers 46, 48 of another link 20. The fingers 46, 52 and 48 lie on vertically spaced apart horizontal planes with respect to a plane passing through the bottom end of the housing.

The other or second female connecting member indicated generally by the reference numeral 53 comprises a pair of transversly spaced apart legs 54, 56 positioned in an opposed relationship. The complementary male connecting member comprises a leg 58 positioned on the opposite side of the housing with respect to the female member 53. Finger 58 is transversly disposed to telescope within the space between the legs 54, 56 of the female connecting member 53 of another link 20. The legs 54, 58 and 56 lie on horizontally spaced apart vertical planes with respect to a plane passing through the bottom end of the housing.

Apertures 66 are formed in the outer ends of the fingers and legs of the connecting members to accommodate a screw member 68 (FIGS. 5 to 7, 9 and 10) for securing the links together. Apertures 66 may be threaded. Alternatively, the female fingers may be made from a resilient material to spread apart and resiliently lock with a male member.

A centrally disposed cylindrical opening 70 (FIG. 8) extends from the bottom of the socket to the bottom end of the housing 24. The upper end 71 of the opening 70 is countersunk to accommodate the flat head of a screw 72 (FIG. 8) inserted inside the opening to secure the link to a floor or ground surface.

An aperture 74 (FIG. 4) is formed in the wall of the housing at a point below the ball 28, when the same is positioned in the socket 26. Thus, a suitable pin or elongated object may be inserted in the opening to lift the ball 28 out from the housing 24. However, as aforestated, the ball 28 if magnetically attractive, may be conveniently lifted from the socket with a magnet.

Turning now to FIGS. 5 to 7, 9 and 10, some of the possible conveyors formed from a plurality of the identical links 20 will be described. Beginning first with FIG. 5, it will be seen that the female connecting member 53 of one link 20 is connected to a complementary male connecting member 58. In this manner, a plurality of the links 20 are connected in series to form the conveyor 20a which is shown extending over a flat surface. FIG. 6 illustrates a plurality of the links 20 similary connected, but extending over an inclined and irregularly contoured surface.

FIG. 7 illustrates three rows of links 20 connected together to form a substantially rectangular shaped conveyor 22C. Particularly note that in the middle row all the connecting members are being utilized.

In FIG. 9, two circular rows of links 20 are shown connected together to form a circular conveyor 22d. As may be noted, every other link 20 of the outer row is connected to one of the links 20 of the inner row.

In FIG. 10, a conveyor indicated by the reference numeral 22e is shown particularly suitable for a boat 76 and comprises a trough 78 having a triangular cross section. The links 20 are mounted on the inside of the trough and connected together. The sides and keel of the boat are supportable inside the conveyor and hence the boat may be readily and conveniently moved therethrough. To utilize the conveyor 22e for moving the boat up and down along an inclined surface, such as an inclined boat landing, the trough 78 should first be secured in place by any suitable means.

From the drawings and the foregoing description, it should be apparent that a novel link for a portable conveyor has been provided which accomplishes the aforestated objects in an efficient and simplified manner. Thus, the link 20 is designed whereby a plurality of the same may be connected together to form a conveyor of substantially any configuration. Moreover, the complete adjustability of the position of the links due to the universal attachment means extending outward from the housing thereof, enables a conveyor to be formed suitable for use over substantially any contoured surface.

Although the attachment means of link 20 is shown comprising female connecting members 45 and 53 having spaced apart fingers and legs respectively, it is also within the contemplation of the invention that only one finger and leg respectively may be used and connected to members 52 and 58 respectively of another link 20.

What I claim and desire to secure by Letters Patent of the United States is:

1. A link for a conveyor including a housing, a ball rotatably positioned in the housing, retaining means to maintain the ball inside the housing, and connecting means for connecting one said link with another said link, said connecting means comprising:

a female connecting member extending outward from the housing and comprising an upper finger spaced above a lower finger;

a first male connecting member extending outward from the housing, said male member comprising an intermediate finger positioned at a level substantially intermediate of said upper and lower fingers for telescoping between the upper and lower fingers of another said link;

a second female connecting member extending outward from the housing and comprising a first leg spaced apart from a second leg on a plane substantially parallel with the bottom of the housing; and a second male connecting member extending outward from the housing and comprising a third leg lying on substantially said parallel plane for telescoping between the first and second legs of another said link.

2. A link for a conveyor including a housing, a ball movably positioned in the housing and having a portion thereof protruding out from the housing, retaining means to maintain the ball inside the housing, connecting means for connecting one said link with another said link comprising:

a first finger extending outward from said housing;

a second finger extending outwardly from substantially the opposite side of the housing with respect to the first finger and spaced above the first finger, each of said fingers comprising an upper and lower face, joined by an edge surface, said faces having substantially greater area than the edge surface, the face of each of said fingers lying on a plane substantially parallel with the bottom of said housing;

a first leg extending outward from said housing; and a second leg extending outward from substantially the opposite side of the housing with respect to said first leg, said first leg and second leg lying on a plane substantially parallel with the bottom of the housing, each of said legs comprising a front face and a rear face joined together by an edge surface, said faces having substantially greater area than the edge surface, said front and rear faces of said legs lying on planes substantially perpendicular to the bottom of said housing, whereby said fingers and legs afford means for connecting said links in a plurality of configurations on level and irregularly contoured surfaces.

3. A link for a conveyor including a housing, a ball positioned in the housing and having a portion thereof projecting out from the housing, retaining means to maintain the ball inside the housing, the herein improvement comprising:

a circular recess formed in the upper end of the outer surface of the housing;

a cap member is removably positioned on said housing, said cap member including an opening to accommodate the portion of said ball projecting out from the housing, said cap having a circular collar extending inward from the inside surface thereof, said collar being pressfitted inside said recess when said cap is positioned on said housing, said cap being lifted upwardly with respect to the outer end of the housing to release said collar from the recess and thereby removing the cap from the housing.

4. A link for a conveyor including a housing, a ball movably positioned in the housing and having a portion thereof projecting out from the housing, retaining means to maintain the ball inside the housing, the herein improvement comprising:

a recess formed in the upper end of the outer surface of the housing;

a cap member removably positioned on said housing, said cap member including an opening to accommodate the portion of said ball projecting out from the housing, said cap having a collar extending inward from the inside surface thereof, said collar fitting within said recess when said cap is positioned on said housing;

a first female connecting member extending out from the housing and comprising an upper finger spaced above a lower finger;

a first male connecting member extending outward from the opposite side of the housing with respect to said first female connecting member, said male member comprising a finger positioned at a level intermediate of said upper and lower fingers whereby the male finger telescopes between the upper and lower fingers of the first female member of another said link;

means for securing said last-mentioned fingers together;

a second female connecting member extending outward from the housing and comprising a leg spaced apart from another leg on a plane parallel with the bottom of the housing;

a second male connecting member extending outward on the opposite side of the housing with respect to said second female member, said male member comprising a leg positioned to telescope between the legs of the second female member of another said link; and means for securing said last-mentioned legs together.

References Cited

UNITED STATES PATENTS

| 1,610,166 | 12/1926 | Schmierer | 16—24 |
| 1,963,956 | 6/1934 | Craig | 193—35 |
| 2,555,078 | 5/1951 | Gaylor | 272—56.5 X |
| 1,053,895 | 2/1913 | Algermissen. | |
| 2,242,206 | 5/1941 | Bisset. | |
| 2,494,302 | 1/1950 | Mason | 193—35 |
| 2,822,073 | 2/1958 | Payne | 193—35 |

FOREIGN PATENTS

| 29,075 | 12/1897 | Great Britain. |
| 543,524 | 3/1942 | Great Britain. |

ANDRES H. NIELSEN, *Primary Examiner.*